United States Patent
Trifonov

(10) Patent No.: US 7,583,803 B2
(45) Date of Patent: Sep. 1, 2009

(54) QKD STATIONS WITH FAST OPTICAL SWITCHES AND QKD SYSTEMS USING SAME

(75) Inventor: Alexei Trifonov, Boston, MA (US)

(73) Assignee: MagiQ Technologies, Inc., New York, NY (US)

( * ) Notice: Subject to any disclaimer, the term of this patent is extended or adjusted under 35 U.S.C. 154(b) by 386 days.

(21) Appl. No.: 11/495,962

(22) Filed: Jul. 28, 2006

(65) Prior Publication Data

US 2009/0180615 A1    Jul. 16, 2009

(51) Int. Cl.
H04L 9/00    (2006.01)
H04L 9/08    (2006.01)

(52) U.S. Cl. ............... 380/278; 380/277; 380/255; 380/256

(58) Field of Classification Search ............... None
See application file for complete search history.

(56) References Cited

U.S. PATENT DOCUMENTS

| | | | | |
|---|---|---|---|---|
| 4,652,744 | A * | 3/1987 | Bowers et al. | 250/227.27 |
| 5,307,410 | A | 4/1994 | Bennett | |
| 5,659,567 | A * | 8/1997 | Roberts et al. | 372/82 |
| 5,675,648 | A * | 10/1997 | Townsend | 380/278 |
| 6,438,234 | B1 | 8/2002 | Gisin et al. | 380/256 |
| 6,728,281 | B1 * | 4/2004 | Santori et al. | 372/45.01 |
| 6,982,822 | B2 * | 1/2006 | Teich et al. | 359/330 |
| 7,211,812 | B2 * | 5/2007 | Takeuchi | 250/493.1 |
| 7,346,166 | B2 * | 3/2008 | Inoue et al. | 380/263 |
| 7,349,545 | B2 * | 3/2008 | Kim | 380/283 |
| 7,365,858 | B2 * | 4/2008 | Fang-Yen et al. | 356/489 |
| 2004/0126057 | A1 * | 7/2004 | Yoo | 385/16 |
| 2004/0258421 | A1 * | 12/2004 | Conti et al. | 398/183 |
| 2005/0135627 | A1 * | 6/2005 | Zavriyev et al. | 380/278 |
| 2008/0118201 | A1 * | 5/2008 | Beausoleil et al. | 385/14 |

FOREIGN PATENT DOCUMENTS

GB    2397452    7/2004
GB    2405294    2/2005

OTHER PUBLICATIONS

Hiskett et al, "Long-distance quantum key distribution in optical fiber", http://arxiv. org, preprint quant-ph/0607177.

* cited by examiner

Primary Examiner—Syed A. Zia
(74) Attorney, Agent, or Firm—Opticus IP Law PLLC

(57) ABSTRACT

The quantum key distribution (QKD) systems (200, 300, 400) of the invention includes first and second QKD stations (Alice and Bob) according to the present invention, wherein either one or both QKD stations include fast optical switches (120, 220, 310, 320). Each fast optical switch is respectively optically coupled to two different round-trip optical paths (OP1 and OP2 at Alice, OP3 and OP4 at Bob) of different length that define respective optical path differences $OPD_A$ and $OPD_B$, wherein $OPD_A = OPD_B$. By switching the fast optical switches using timed switching signals (S1-S3 at Alice, S4-S6 at Bob) from their corresponding controllers (CA at Alice, CB at Bob), the quantum signals—which can be single-photon or weak-coherent pulses—can be generated from a single optical pulse (112), randomly selectively encoded while traversing the optical paths in Alice and Bob, and then interfered and measured (detected) at Bob. The QKD system has less loss as compared to conventional fiber-based QKD systems because it omits at least some of the beamsplitters in conventional QKD systems.

21 Claims, 4 Drawing Sheets

QKD STATIONS WITH FAST OPTICAL SWITCHES AND QKD SYSTEMS USING SAME

TECHNICAL FIELD OF THE INVENTION

The present invention relates to quantum cryptography, and in particular relates to quantum key distribution (QKD) systems and QKD stations used in QKD systems.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

The above-mentioned patent and publication by Bennett each describe a QKD system wherein Alice randomly encodes the polarization or phase of single photons at one end of the system, and Bob randomly measures the polarization or phase of the photons at the other end of the system. The QKD system described in the Bennett 1992 paper is based on two optical fiber Mach-Zehnder interferometers (one at Alice and one at Bob). Respective parts of the interferometric system are accessible by Alice and Bob so that each can control the phase of the interferometer.

FIG. 1 is a schematic diagram of a prior art QKD system 10 based on those disclosed in U.S. Pat. No. 5,307,410 to Bennett ("the Bennett patent") and U.S. Pat. No. 5,953,421 to Townsend ("The Townsend patent), which patents are incorporated herein by reference. QKD system 10 includes two QKD stations Bob and Alice. Not shown in FIG. 1 are controllers in Alice and Bob that control the operation of their respective elements, and that are in operable communication with each another to coordinate the operation of the QKD system as a whole.

Alice includes a laser source L1 and a first interferometer loop 12 formed from beamsplitters 11 and 13 connected by optical fiber sections 14 and 16 of different lengths. Optical fiber section 14 includes a modulator (polarization or phase) MA. Interferometer loop 12 is coupled to an optical fiber link FL, which is connected to a second interferometer loop 22 at Bob. Loop 22 is formed from beamsplitters 21 and 23 connected by optical fiber sections 24 and 26 of different lengths. A (polarization or phase) modulator MB is arranged in optical fiber section 24. Loop 22 is coupled to a detector unit 30 via an optical fiber section F3 optically coupled to beamsplitter 23. The detector unit 30 may include, for example, two single-photon detectors (SPDs) coupled to optical fiber section F3 by an optical coupler, such as illustrated and discussed in the Townsend patent. Detector unit 30 may also include a single SPD, such as illustrated and discussed in the Bennett patent.

In operation, laser source L1 generates a light pulse P0 that is divided into two pulses (signals) P1 and P2 by first interferometer loop 12. One of the pulses (say P1) is randomly modulated by modulator MA. The two pulses, which are now separated due to the different path lengths of the optical fiber sections 12 and 14, are attenuated so that they are weak (i.e., one or less photons per pulse on average). The photons then travel over fiber link FL to second interferometer loop 22.

At interferometer loop 22, each signal P1 and P2 is then split into two signals (P1 into P1a and P1b, and P2 into P2a and P2b). Two of the signals (say P1a and P2a) travel over optical fiber section 24, while the other two signals (say P1b and P2b) travel over optical fiber section 26. One of the signals traveling over optical fiber section 24 (say, P2a) is randomly modulated by modulator MB.

The second interferometer loop then combines the signals onto fiber section F3. If the two interferometer loops 12 and 22 have the same overall path length (e.g., the lengths of optical fiber sections 14 and 24 are the same, and the lengths of optical fiber sections 16 and 26), then the two signals that travel the same optical path length (say, pulses P2a and P2b) interfere to create a single interfered signal I. The other ancillary signals AS enter fiber section F3 separated from one another because they followed optical paths of different lengths.

The interfered signal I is then detected by detector unit 30 in a manner that reflects the polarization or phase modulation imparted to the interfered signal. The process is repeated to create a number of interfered signals I, which are detected and processed according to known QKD techniques to establish a secret key between Alice and Bob.

The use of interferometer loops formed from optical fibers or beam splitters to create multiple signals is standard in QKD systems. However, such arrangements tend to be lossy and are fairly complex because the loops have to be thermally stabilized. Further, there is a strict requirement for interferometer arm balancing. A laser L1 normally has narrow signals (for example, with full width at half maximum (FWHM) of approximately 100 ps), so the lengths of short-long arms should be balanced within an accuracy of hundreds of microns to obtain a good extinction ratio. Interfering signals (e.g. P2a and P2b) should overlap in the time domain. In manufacturing, this puts strict requirements on fiber splicing and system component selection.

SUMMARY OF THE INVENTION

A first aspect of the invention is a quantum key distribution (QKD) station. The QKD station includes a light source adapted to generate an optical pulse. A fast optical switch is optically coupled (e.g., via an optical fiber, free-space, etc.) to the light source and has an output port. The fast optical switch has a first operating state that forms first and second quantum signals from each optical pulse. First and second optical paths having different optical path lengths are optically coupled to the fast switch. The first and second quantum signals travel over first and second optical paths respectively, and return to the fast optical switch at different times. The fast optical switch is switchable to send the first and second quantum signals out of the output port in the order in which they arrive at the fast optical switch.

A second aspect of the invention is a method of generating quantum signals for quantum key distribution (QKD). The method includes sending optical pulses to a fast optical switch and setting the fast optical switch to a first operating state that divides each optical pulse into first and second quantum signals. The method also includes sending the first and second quantum signals over two different optical paths so that the first quantum signal returns to the fast optical switch before the second quantum signal. The method further includes switching the fast optical switch to the second operating state so that the first quantum signal is directed out of an output port of the fast optical switch, and switching the fast optical switch to a third operating state so that the second quantum signal is directed out of the output port after the first quantum signal.

These and other aspects of the invention are described in detail below.

Figure 1:
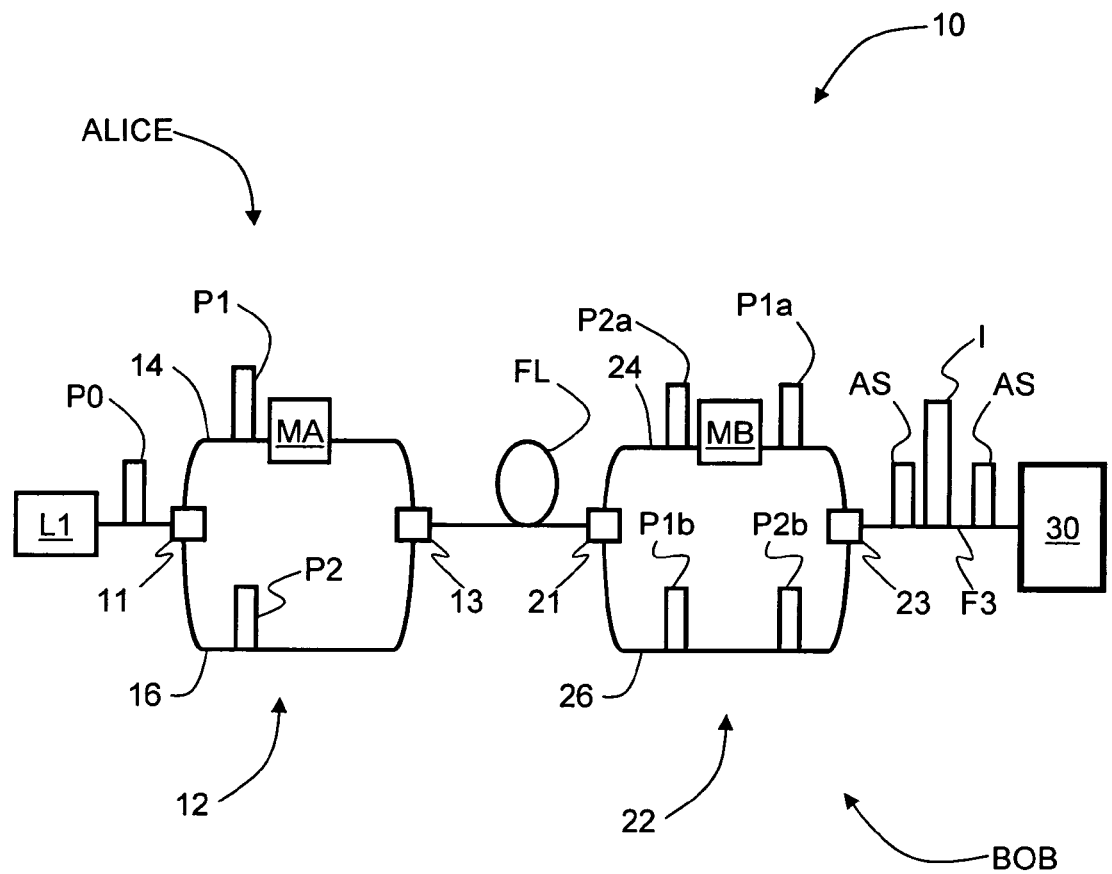
FIG. 1 is a schematic diagram of a prior-art QKD system based on optical fiber interferometer loops and beamsplitters.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

In the example embodiments of Alice and Bob described below, optical fiber sections are used to optically couple the optical elements for the sake of illustrating the invention. However, in general the optical coupling can be done via free-space or using other optical media, such as optical waveguides as part of an integrated optical device embodiment.

Also, the term "optical path" (OP) is used below. The "optical path" between elements is defined as the physical distance d light travels between the elements taking into account the index of refraction (n) the light encounters while traveling between the elements—i.e., OP=(d)(n). In the case where the optical path is over an optical fiber section, the refractive index n is that of the given optical fiber section, and d is the length of the optical fiber section. The difference between optical paths is called the "optical path difference" or "OPD."

Also, the term "optically coupled" as in "A is optically coupled to B" is used herein denote the existence of a light path between A and B such that light can travel from A to B and/or from B to A. An "optical path" being "optically coupled" to an element means that light can travel to and/or from the element along the optical path.

Also in the discussion below, it is assumed for the sake of illustration that the optical fiber sections are relatively short (e.g., less than 1 meter), so that optical fiber birefringence (i.e., different indices of refraction along different optical axes of an optical medium) is not a substantial effect. Accordingly, for all practical purposes, the quantum signals see the same refractive index n regardless of their polarization.

I. FIRST EXAMPLE EMBODIMENT

Figure 2:
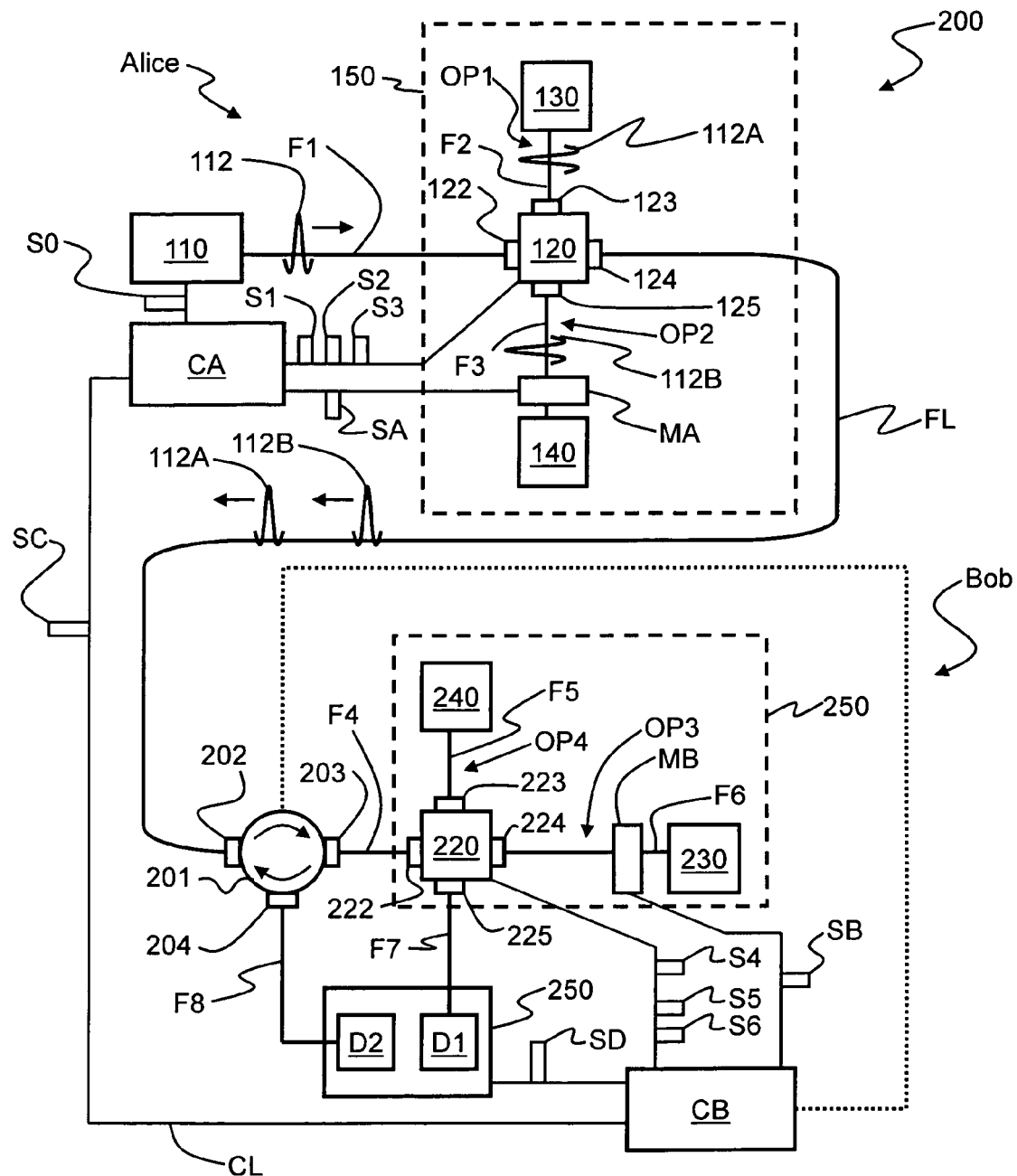
FIG. 2 is a schematic diagram of an example embodiment of a QKD system according to the present invention that utilizes QKD stations having fast switches, obviating the need for beamsplitters and optical fiber interferometer loops.

FIG. 2 is a schematic diagram of an example embodiment of a QKD system 200 according to the present invention that utilizes QKD stations having fast optical switches and that obviates the need for beamsplitters and optical fiber interferometer loops. QKD system 200 includes two QKD stations Alice and Bob. Alice and Bob are optically coupled, e.g., by an optical fiber link FL. The two QKD stations Alice and Bob are described below, followed by the method of operation of QKD system 200.

Alice

Alice includes a light source 110 adapted to emit single-photon-level optical pulses 112. In an example embodiment, optical pulses 112 are "quantum signals" that are either each made up of a single photon, or are weak coherent pulses (WCPs) having, for example, less than a single photon on average as calculated based on Poissonian statistics.

Light source 110 is optically coupled to a fast optical switch 120. In an example embodiment, a first optical fiber section F1 optically connects light source 110 to fast optical switch 120. Other types of optical coupling are also possible, such as free-space optical coupling. Fast optical switch 120 is, for example, a lithium-niobate-based nanosecond or sub-nanosecond optical switch, such as is available from EOSPACE, Inc., Redmond, Wash. In an example embodiment, fast optical switch 120 has a timing resolution of 25 ps or faster, while the switching speed is 1 ns or faster, which is about same or faster than the time delay associated with a typical prior art optical fiber delay loop (FIG. 1).

In an example embodiment, fast optical switch 120 has four ports 122, 123, 124 and 125. Port 122 is an input port, port 124 is an output port, and ports 123 and 125 are output/input "side ports." Fast optical switch 120 has three operating states. In a first operating state, called the "beam splitter" state, fast optical switch 120 acts as a 50/50 beam splitter that divides a light pulse inputted into port 122 into two equal-intensity light pulses that are respectively outputted at ports 123 and 125. In the second operating state, the fast optical switch directs light inputted into port 123 out of port 124. In the third operating state, the fast optical switch directs light inputted into port 125 out of port 124.

In an example embodiment, Alice includes a first Faraday mirror 130 optically coupled to fast optical switch 120 at port 123. In an example embodiment, the optical coupling is accomplished via an optical fiber section F2. Faraday mirror 130 defines a first round-trip optical path OP1 between the Faraday mirror and fast optical switch 120. Likewise, a second Faraday mirror 140 is optically coupled to fast optical switch 120 at port 125. Faraday mirror 140 defines a second round-trip optical path OP2 between the Faraday mirror and fast optical switch 120. In an example embodiment, the optical coupling is accomplished via an optical fiber section F3.

In an example embodiment, optical fiber link FL is optically coupled to output port 124 of fast optical switch 120. Also in an example embodiment, optical path OP1 is shorter than optical path OP2. This optical path difference (OPD) at Alice is defined as |OP2-OP1| and is referred to hereinbelow as $OPD_A$.

Alice further includes a phase modulator MA arranged in optical path OP2 between fast optical switch 120 and Faraday mirror 140, e.g., included in optical fiber section F3. Fast switch 120, Faraday mirrors 130 and 140 optically coupled thereto, and phase modulator MA constitute a first fast-switch interferometer arm 150.

Alice also includes a controller CA operably coupled to light source 110, to optical switch 120, and to phase modulator MA. Controller CA is also operably coupled to a controller CB at Bob via a communication link CL. Controller CA is adapted to control the operation of light source 110, optical switch 120 and modulator MA, including driving phase modulator MA to provide a random phase modulation selected from a set of basis phase modulations. This action is referred to herein as "selective random modulation." This modulation is timed to the expected arrival time of a quantum signal passing through the modulator.

Bob

Bob includes a circulator 200 having three ports 202, 203 and 204. Optical fiber link FL is optically coupled to port 202. Bob also includes a fast optical switch 220 optically coupled to circulator port 203, e.g., via an optical fiber section F4. In an example embodiment, fast optical switch 220 has four ports 222, 223, 224 and 225, all of which are input/output ports. For convenience, port 222 is referred to as an "input port" because it receives quantum signals from Alice, as described below.

Fast optical switch 220 has three operating states analogous to those of fast optical switch 120. In the first "beam splitter" state, fast optical switch 220 acts as a 50/50 beam splitter wherein a light pulse inputted into port 222 is equally divided into two light pulses that are outputted at ports 223 and 224 (or in reverse, two light pulses entering respective ports 223 and 224 are combined and outputted at port 222). In the second operating state, the fast optical switch directs light inputted into port 222 out of port 223 (or vice versa). In the third operating state, the fast optical switch directs light inputted into port 222 out of port 224 (or vice versa). This third operating state is called the "pass through" state.

A third Faraday mirror 230 is optically coupled to fast optical switch 220 at port 224. Faraday mirror 230 defines a third round-trip optical path OP3 between the Faraday mirror and fast optical switch 220. In an example embodiment, the optical coupling is accomplished using an optical fiber section F6. A fourth Faraday mirror 240 is optically coupled to fast optical switch 220 at port 223. Faraday mirror 240 defines a fourth round-trip optical path OP4 between the Faraday mirror and fast optical switch 220. In an example embodiment, the optical coupling is accomplished via an optical fiber section F5. Also in an example embodiment, optical path OP3 is different (e.g., longer) than optical path OP4. This OPD at Bob is defined as |OP4-OP3| and referred to hereinbelow as $OPD_B$. In order for the QKD system to operate as an interferometer, the quantum signals must arrive at the same place at Bob close enough in time for them to interfere. This requires that $OPD_A=OPD_B$, e.g., OP1=OP4 and OP2=OP3.

Bob further includes a phase modulator MB arranged in optical path OP3 between fast optical switch 220 and Faraday mirror 230, e.g., is included in optical fiber section F6. Fast switch 220, Faraday mirrors 230 and 240 optically coupled thereto, and phase modulator MB constitute a second fast-switch interferometer arm 250.

Bob also includes a detector unit 254 optically coupled to port 225 of fast optical switch 220, e.g., via an optical fiber section F7. In an example embodiment, detector unit 254 includes two single-photon detectors (SPDs) D1 and D2.

Bob's controller CB is operably coupled to fast optical switch 220, to phase modulator MB, and to detector unit 254, as well as to Alice via communication link CL. Controller CB is optionally coupled to circulator 200 (dashed line) in the case where the circulator is an active device. Controller CB is adapted to control the operation these elements, including driving phase modulator MB to provide a selective random phase modulation.

Method of Operation of First Example Embodiment

With continuing reference to FIG. 2, in the operation of QKD system 200 controller CA sends light source 110 an activation signal S0 that causes the light source to generate optical pulses 112 having an initial polarization (say, horizontal). Each optical pulse 112 encounters fast optical switch 120, which is set by controller CA via a switching signal S1 to be in the beam-splitter state prior to the arrival of optical pulse 112. Optical switch 120 thus splits each optical pulse 112 into two quantum signals 112A and 112B, which exit respective ports 123 and 125 and travel in opposite directions over optical fiber sections F2 and F3 to Faraday mirrors 130 and 140, respectively.

Recall that the optical path OP1 is shorter than optical path OP2. This means that quantum signal 112A is reflected back to and arrives at fast optical switch 120 prior to quantum signal 112B. Thus, as quantum signal 112A is traveling in optical fiber section F2 (i.e., along optical path OP1), controller CA changes the state of the fast optical switch from the beam-splitter state to the second operating state via a switching signal S2. Thus, when fast optical switch 120 receives quantum signal 112A at port 123, it directs this quantum signal out of port 124 and onto optical fiber link FL.

Controller CA then changes the state of fast optical switch 120 to the third operating state via a switching signal S3. Quantum signal 112B traveling in optical fiber section F3 (i.e., along optical path OP2) is selectively randomly modulated by modulator MA as it passes therethrough. This is accomplished by controller CA sending a modulation signal SA timed to coincide with the arrival of quantum signal 112B at modulator MA. Fast optical switch 120 receives quantum signal 112B at sideport 125 and directs this quantum signal out of output port 124 and onto optical fiber link FL. This results in quantum signal 112B traveling down the optical fiber link behind the previously directed quantum signal 112A.

Because a Faraday mirror orthogonally rotates the polarization of a given pulse upon reflection, the quantum signals 112A and 112B have their polarization changed from horizontal (H) to vertical (V) polarization upon reflection from respective Faraday mirrors 130 and 140. Thus, quantum signals 112A and 112B are vertically polarized as they travel down optical fiber link FL.

In an example embodiment, controller CA is adapted to control the timing of switching signals S1, S2 and S3, as well as timing of modulation signal SA, by generating an internal timing signal (not shown) based on when controller CA sends activation signal S0 to light source 110. The timing of the switching signals S1, S2 and S3 and modulation signal SA is also based on the various optical path lengths taken by the quantum signals, and the electronic delays of the electronic links between the controller CA and light source 110, fast switch 120, and phase modulator MA.

At this point, the two quantum signals 112A and 112B travel down optical fiber link FL from Alice to Bob, with quantum signal 112B trailing quantum signal 112A by a time delay of Δt that corresponds to the optical path difference $OPD_A$ via the relationship $OPD_A=(c/n)(\Delta t)$. Here, n is the refractive index present in optical paths OP1 and OP2 and is assumed to be the same. In one example embodiment, the time delay Δt is on the order of nanoseconds, while in another example embodiment the delay is sub-nanosecond, depending on the switching speed of fast optical switch 120.

In an example embodiment, Alice's controller CA sends Bob's controller CB a synchronization signal SC over communication link CL that provides timing information concerning the two quantum signals 112A and 112B. This allows Bob to provide timed control signals to the various active elements therein. Note that in a variation of this example embodiment, communication link CL is incorporated as a communication channel in optical fiber link FL rather than being a separate communication link as shown in FIG. 2.

With continuing reference to FIG. 2, quantum signal 112A is first to arrive at Bob and encounters circulator 201. Circulator 201 is adapted to pass vertically polarized quantum signals directly from port 202 to port 203 and onto optical fiber section F4. Prior to the arrival of quantum signal 112A at fast switch 220, controller CB sets this fast optical switch to the second operating state via a switching signal S4. Thus, when quantum signal 112A encounters fast optical switch 220 at input port 222, the fast optical switch directs this quantum signal to exit side port 223 and into optical fiber section F5.

Controller CB then sets fast optical switch 220 to its third operating state via a switching signal S5 so that when quantum signal 112B arrives at port 222, it passes directly through to port 224 and into optical fiber section F6 (optical path OP3). Controller CB sets modulator MB to selectively randomly modulate quantum signal 112B as it passes therethrough. In an example embodiment, although quantum signal 112B passes twice through modulator MB, it is only modulated during one pass.

Recall, $OPD_A = OPD_B$. For example, the relatively "short" optical path OP1 at Alice is the same length as optical path OP4 at Bob. Likewise, the relatively "long" optical path OP2 at Alice is the same length as optical path OP3 at Bob. Since quantum signals 112A and 112B each travel over both the long and short optical paths, they experience the same overall total optical path. Accordingly, the quantum signals 112A and 112B overlap at fast optical switch 220 after reflecting from respective Faraday mirrors 230 and 240. Note also that Faraday mirrors 230 and 240 flip the polarization of quantum signals 112B and 112A respectively, thereby making the quantum signals horizontally (H) polarized as they return to fast optical switch 220.

While quantum signals 112A and 112B are traveling in respective optical fiber sections F5 and F6 (i.e., optical paths OP4 and OP3, respectively), controller CB changes the state of fast optical switch 220 from the second operating state to the first beam splitter state via a switching signal S6. Consequently, when quantum signals 112A and 112B return to fast optical switch 220, they are recombined (interfered) to form a single interfered quantum signal 112'.

Depending on the relative phases imparted to quantum signals 112A and 112B by the selective random modulation of phase modulators MA and MB, the interfered quantum signal 112' travels out of port 225 and to SPD D1 via optical fiber F7 (constructive interference), or out of port 222 and to over to circulator 201, which directs the (horizontally polarized) interfered quantum signal 112' out of port 204 and onto optical fiber section F8, and then to SPD D2.

Note that unlike the prior art QKD system described above, the QKD system of the present invention does not generate ancillary pulses beyond the single interfered quantum signal. This allows for the optical path lengths between the fast optical switches and their respective Faraday mirrors to be shorter than the path lengths associated with prior art optical fiber interferometer loops.

Fast optical switches 120 and 220 preferably have a loss of about 1.5 dB or smaller, while each beamsplitter in the prior art QKD system introduces a loss of 3 dB. Accordingly, QKD system 200 of the present invention reduces the amount of loss relative to the prior art interferometer-loop-based QKD systems.

II. SECOND EXAMPLE EMBODIMENT

Figure 3:
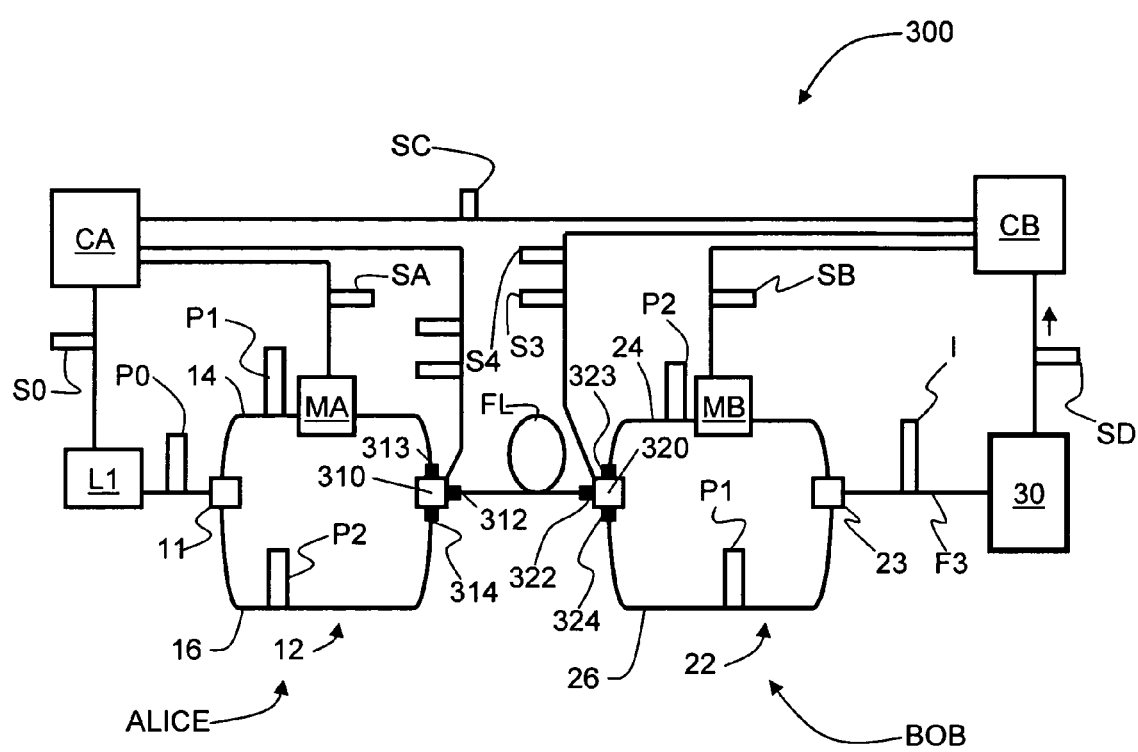
FIG. 3 is a schematic diagram of a QKD system according to the present invention that utilizes QKD stations having fast switches in combination with optical fiber interferometer loops in the case where the light source generates quantum signals in the form of weak coherent pulses (WCPs)

FIG. 3 is a schematic diagram of an example embodiment of a QKD system 300 according to the present invention. QKD system 300 is similar to the prior art QKD system 10 shown in FIG. 1. In QKD system 300, however, light source L1 is a weak coherent pulse (WCP) source and fast optical switches 310 and 320 replace beamsplitters 13 and 21. Alice also has a controller CA and Bob has a controller CB. Controllers CA and CB are operably coupled via a communication link CL that carries synchronization signals SC in the manner described in connection with QKD system 200 of FIG. 2.

Fast optical switch 310 has an output port 312, and two side ports 313 and 314. Similarly, fast optical switch 320 has an input port 322, and two side ports 323 and 324. Fast optical switch 310 has first and second operating states. In the first operating state, the switch directs light entering at side port 313 out of output port 312. In the second operating state, the switch directs light entering at side port 314 out of output port 312. Likewise, fast optical switch 320 has first and second operating states. In the first operating state, the switch directs light entering input port 332 out of side port 324. In the second operating state, the switch directs light entering input port 322 out of side port 323.

In operation, Alice's controller CA sends light source L1 an activation signal S0 that causes the light source to generate optical pulse P0. At the same time, controller CA generates synchronization signal SC, which travels over to Bob's controller CB over communication link CL. Pulse P0 travels to beamsplitter 11, which splits the pulse into two pulses P1 and P2, with pulse P1 traveling over optical fiber section 14 and pulse P2 traveling over optical fiber section 16. Controller CA then generates a modulation signal SA that causes modulator MA to selectively randomly modulate pulse P1.

Prior to the arrival of pulses P1 and P2 at fast optical switch 310, controller CA sends a first switching signal S1 to the fast optical switch to put the switch in the first operating state. Thus, when pulse P1 arrives at the fast optical switch at side port 313, it is directed out of output port 312 and onto optical fiber link FL. Controller CA then sends a second switching signal S2 to fast optical switch 310 that places the switch in the second operating state. Thus, when pulse P2 arrives at the fast optical switch at side port 314, it is directed out of output port 312 and onto optical fiber link FL behind pulse P1.

Meanwhile at Bob, controller CB sends a switching signal S3 that places optical switch 320 in the first operating state. Thus, when pulse P1 enters optical switch 320 at input port 322, it is directed out of side port 324 and onto optical fiber section 26. Controller CB then sends a switching signal S4 that places optical switch 320 in the second operating state. Thus, when pulse P2 enters optical switch 320 at input port 322, it is directed out of side port 323 and onto optical fiber section 24. Controller CB also sends a modulation signal SB to modulator MB to cause the modulator to selectively randomly modulate pulse P2. Now-modulated pulses P1 and P2 are then combined at beamsplitter 23 and the interfered pulse I is detected by detector unit 30. Detector unit 30 generates a detector signal SD that travels to and is processed by controller CB. Detector signal SD includes information about the overall modulation of interfered signal 1.

Note that there are no ancillary pulses formed by QKD system 300. This allows for the optical paths to be made shorter as compared to those in the prior art QKD system 10 shown in FIG. 1. Also, the elimination of two beamsplitters significantly reduces loss in the system.

III. THIRD EXAMPLE EMBODIMENT

Figure 4:
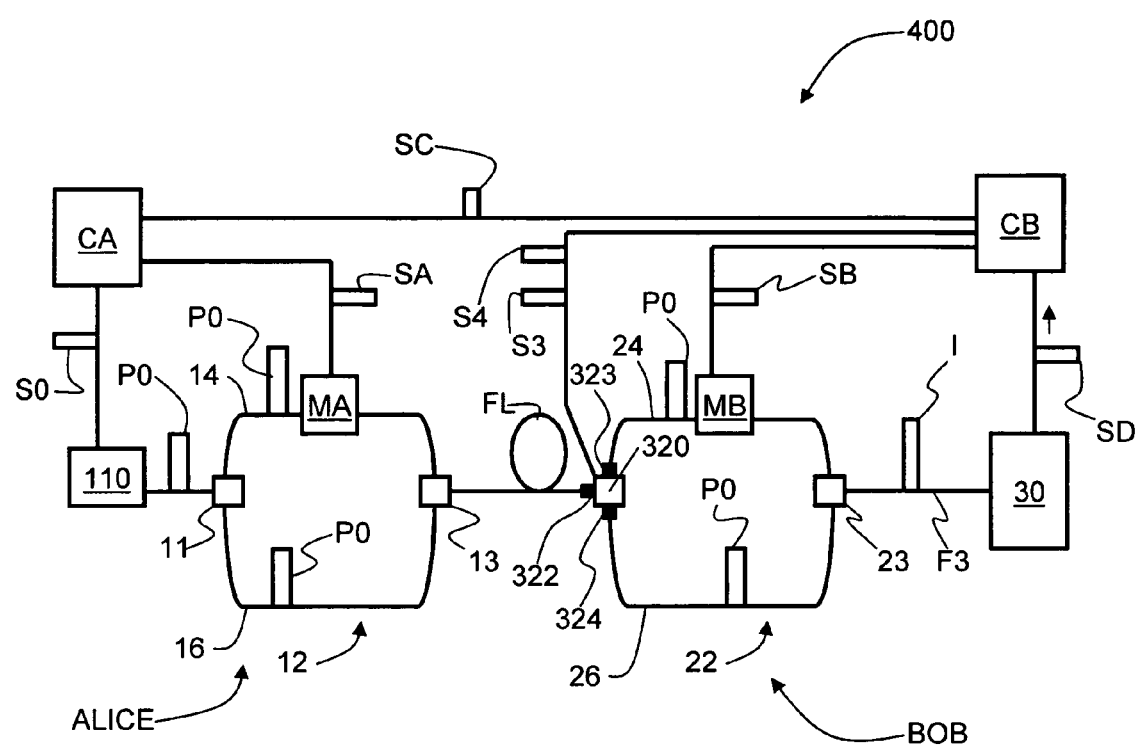
FIG. 4 is a schematic diagram of an example embodiment of a QKD system similar to FIG. 3, but for the case where the light source generates single-photon quantum signals.

FIG. 4 is a schematic diagram of a QKD system 400 similar to that of QKD system 300 of FIG. 3, but wherein the light source 110 is a single photon source, and wherein the system includes a single fast optical switch 320 at Bob.

In the operation of QKD 400, Alice's controller CA sends light source 110 an activation signal S0 that causes the light source SPS to generate a single-photon quantum signal P0. At the same time, controller CA generates synchronization signal SC, which travels over to Bob's controller CB over communication link CL. Single-photon quantum signal P0 travels to beamsplitter 11. Because quantum signal P0 is a single photon, instead of this pulse being split into two, the pulse is described in terms of the probability of it being in one arm of the loop or the other. Hence, pulse P0 is shown as being in both optical fiber sections 14 and 16. Controller CA activates phase modulator MA to coincide with the expected arrival time of pulse P0 at the modulator. Modulator MA thus selectively randomly modulates the quantum signal. The quantum signal P0—or more precisely, the probability amplitudes of quantum signal P0—travel over optical fiber link FL to fast optical switch 320. The rest of the system works in analogy to system 300, but instead of the pulses P1 and P2 interfering, the probability amplitudes associated with pulse P0 having taken the different optical paths interfere at beam splitter 23 and the outcome is detected at detector unit 30, which generates a detector signal SD representative of the detected interference. Detector signal SD is then sent to and processed by Bob's controller CB.

In the example embodiments described above, multiple quantum signals are exchanged as described, and are then processed by Bob and Alice using known QKD techniques to establish quantum keys to be used for quantum encryption.

While the present invention is described above in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A quantum key distribution (QKD) system for form forming a quantum key, comprising:
    optically coupled first and second QKD stations configured to form the quantum key from quantum signals exchanged therebetween;
    in the first QKD station, a fast optical switch optically coupled to first and second round-trip optical paths;
    an optical modulator arranged in the first optical path and adapted to provide a selective random phase modulation to quantum signals passing therethrough;
    wherein the fast optical switch is: (i) switchable to a first operating state that divides an incident quantum signal to travel over the respective first and second optical paths, thereby forming a modulated first quantum signal and an unmodulated second quantum signal; and (ii) switchable to second and third operating states that respectively output the modulated first quantum signal and the unmodulated second quantum signal onto an optical fiber link in the order in which the first and second quantum signals are received from the first and second optical paths.

2. A quantum key distribution (QKD) system for forming a quantum key, comprising:
    operably coupled first and second QKD stations configured to form the quantum key from quantum signals exchanged therebetween;
    in the first QKD station, a fast optical switch optically coupled to first and second round-trip optical paths, the fast optical switch including:
    an output port and first and second side ports;
    first and second Faraday mirrors optically coupled to the fast optical switch at the respective first and second side ports, thereby defining respective first and second round-trip optical paths having different optical path lengths;
    a phase modulator arranged in one of the optical paths and adapted to impart a selective random phase modulation to quantum signals passing therethrough;
    a light source optically coupled to the input port and adapted to generate quantum signals; and
    wherein the fast optical switch is switchable between a first operating state that divides an incident quantum signal into first and second quantum signals that travel over the respective first and second round-trip optical paths so as to return a modulated first quantum signal and an unmodulated second quantum signal to the optical switch, and second and third operating states that respectively direct the modulated first and unmodulated second quantum signals out of the output port.

3. The QKD system of claim 2, wherein the first and second Faraday mirrors are optically coupled to the respective first and second side ports via respective first and second optical fiber sections.

4. The QKD system of claim 3, wherein the light source is optically coupled to the input port of the fast optical switch via a third optical fiber section.

5. The QKD system of claim 4, further including an optical fiber link optically coupled to the fast optical switch output port.

6. The QKD system of claim 2, further including a controller operably coupled to the fast optical switch and to the light source so as to control the generation of the quantum signals and providing timed switching signals that switch the fast optical switch between the operating states.

7. The QKD system of claim 2, wherein the first optical switch is a lithium-niobate optical switch.

8. A quantum key distribution (QKD) system for forming a quantum key, comprising:
    a first QKD station having a light source adapted to generate optical pulses, the light source being optically coupled to a first fast optical switch that is optically coupled to first and second round-trip optical paths having an optical path difference $OPD_A$ and that generates first and second quantum signals from each optical pulse;
    a second QKD station optically coupled to the first QKD station and having a second fast optical switch optically coupled to third and fourth round-trip optical paths that have an optical path difference $OPD_B=OPD_A$, the second QKD station including a single-photon detector unit optically coupled to the second fast optical switch; and
    wherein a plurality of first and second quantum signals from the first QKD station are received and interfered by the second fast-optical switch and detected by the single-photon detector unit based on phases selectively randomly imparted to the first and second quantum signals at the first and second QKD stations so as to be processed to form the quantum key.

9. The QKD system of claim 8, including a first controller adapted to provide timed switching signals to switch the first fast optical switch between three operating states.

10. The QKD system of claim 9, including a second controller operably coupled to the first controller and adapted to provide timed switching signals to switch the second fast optical switch between three operating states.

11. The QKD system of claim 10, wherein the first and second fast optical switches each include two Faraday mirrors optically coupled thereto by respective optical fiber sections.

12. A quantum key distribution (QKD) system for forming a quantum key, comprising:
   at a first QKD station: a first fast-switch interferometer arm adapted to generate first and second quantum signals from an optical pulse, selectively randomly encode one of the first and second quantum signals, and sequentially output the first and second quantum signals;
   at a second QKD station: a second fast-switch interferometer arm optically coupled to the first fast-switch interferometer arm and adapted to receive the first and second quantum signals from the first fast-switch interferometer arm, selectively randomly encode one of the first and second quantum signals, and interfere the first and second quantum signals to form an interfered quantum signal;
   a detector unit optically coupled to the second fast-switch interferometer arm to detect the interfered quantum signal; and
   a controller adapted to form the quantum key from a plurality of interfered quantum signals.

13. The QKD system of claim 12, wherein the detector unit is adapted to detect constructive and destructive interference.

14. A method of performing quantum key distribution (QKD) to form a quantum key, comprising:
   sending optical pulses to a fast optical switch in a first QKD station;
   setting the fast optical switch to a first operating state that divides each optical pulse into first and second quantum signals;
   sending the first and second quantum signals over two different optical paths so that the first quantum signal returns to the fast optical switch before the second quantum signal, with at least one of the first and second quantum signals being selectively randomly modulated while traveling in at least one of the optical paths;
   switching the fast optical switch to the second operating state so that the first quantum signal is directed out of an output port of the fast optical switch;
   switching the fast optical switch to a third operating state so that the second quantum signal is directed out of the output port after the first quantum signal; and
   sending the first and second quantum signals to a second QKD station for processing to form the quantum key.

15. The method of claim 14, wherein switching the fast optical switch includes sending timed switching signals from a controller to the fast optical switch.

16. The method of claim 14, including orthogonally rotating the polarization of the first and second quantum signals prior to the first and second quantum signals returning to the fast optical switch.

17. The method of claim 15, wherein said polarization rotating includes reflecting the first and second quantum signals from respective first and second Faraday mirrors.

18. A method of interfering first and second quantum signals to form a quantum key in a quantum key distribution (QKD) system, comprising:
   sequentially receiving the first and second quantum signals sent from a first QKD station at a fast optical switch in a second QKD station;
   switching the fast optical switch between first and second operating states so as to send the first and second quantum signals over respective first and second optical paths that return the first and second quantum signals to the fast optical switch at the same time;
   switching the fast optical switch to a third operating state that forms an interfered quantum signal from the first and second quantum signals; and
   processing a plurality of interfered quantum signals to form the quantum key.

19. The method of claim 17, further including detecting the interfered quantum signals to determine whether the interference was constructive or destructive.

20. The method of claim 17, wherein said switching includes providing timed switching signals from a controller to the fast optical switch.

21. The method of claim 17, including selectively randomly modulating one of the first and second quantum signals in one of the first and second optical paths.

* * * * *